US012631847B1

(12) United States Patent
Huang et al.

(10) Patent No.: US 12,631,847 B1
(45) Date of Patent: May 19, 2026

(54) LENS BARREL WITH AN INTEGRATED TUNABLE LENS

(71) Applicant: Meta Platforms Technologies, LLC, Menlo Park, CA (US)

(72) Inventors: Lidu Huang, Danville, CA (US); Michael Andrew Brookmire, Half Moon Bay, CA (US); Vijay Kumar, Fremont, CA (US); Ingrid Anda Cotoros, Hillsborough, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 343 days.

(21) Appl. No.: 18/210,574

(22) Filed: Jun. 15, 2023

Related U.S. Application Data

(60) Provisional application No. 63/392,285, filed on Jul. 26, 2022.

(51) Int. Cl.
| | |
|---|---|
| *G02B 7/02* | (2021.01) |
| *G02B 26/08* | (2006.01) |
| *G06F 1/16* | (2006.01) |
| *H04N 23/55* | (2023.01) |
| *G02B 27/01* | (2006.01) |
| *H04N 23/54* | (2023.01) |

(52) U.S. Cl.
CPC ......... *G02B 7/021* (2013.01); *G02B 26/0875* (2013.01); *G06F 1/163* (2013.01); *H04N 23/55* (2023.01); *G02B 27/0172* (2013.01); *G02B 2027/0178* (2013.01); *H04N 23/54* (2023.01)

(58) Field of Classification Search
CPC ................ G02B 7/021; G02B 26/0875; G02B 27/0172; G02B 2027/0178; H04N 23/55; H04N 23/54; G06F 1/163
USPC .......................................................... 359/291
See application file for complete search history.

(56) References Cited

U.S. PATENT DOCUMENTS

| | | | |
|---|---|---|---|
| 2009/0190232 A1* | 7/2009 | Craen ...................... | G02B 3/14 359/666 |
| 2016/0202455 A1 | 7/2016 | Aschwanden et al. | |
| 2020/0174165 A1 | 6/2020 | Choi | |
| 2021/0072528 A1 | 3/2021 | Ma et al. | |

OTHER PUBLICATIONS

European Search Report for European Patent Application No. 23185427.4, dated Nov. 20, 2023, 4 pages.

\* cited by examiner

*Primary Examiner* — William Choi
(74) *Attorney, Agent, or Firm* — Freestone Intellectual Property Law PLLC; Aaron J. Visbeek

(57) ABSTRACT

A lens barrel with one or more integrated tunable lens is described. The lens barrel may be a part of an imaging device. The imaging device may include a lens, a tunable lens, and a lens barrel. The tunable lens is configured to adjust its optical power in accordance with an applied signal. The lens barrel is configured to hold the lens and the tunable lens in optical series with each other within the lens barrel. The lens barrel includes an integrated electrode that communicatively couples the tunable lens to a printed circuit board (PCB) which supplies the applied signal.

14 Claims, 8 Drawing Sheets

Imaging
Device
200

Lens Barrel
210

Connector
240

Controller
250

Filter Assembly
230

Sensor Assembly
220

Lens Barrel
<u>210</u>

600

LENS BARREL WITH AN INTEGRATED TUNABLE LENS

CROSS-REFERENCE TO RELATED APPLICATIONS

This application claims the benefit of U.S. Provisional Application No. 63/392,285, filed Jul. 26, 2022, which is incorporated by reference in its entirety.

FIELD OF THE INVENTION

This disclosure relates generally to camera optical systems, and more specifically to a lens barrel with an integrated tunable lens.

BACKGROUND

Wearable devices (e.g., headsets) may include one or more cameras. But as the form factor of these devices is very small and they are generally subject to strict power requirements, the optical assembly of these cameras is generally quite basic. For example, these types of optical assemblies typically are a single wide angle lens that lacks an ability to dynamically adjust its focus.

SUMMARY

A lens barrel configured to hold one or more integrated tunable lenses is described. The lens barrel may be a part of an imaging device. The lens barrel may be configured to hold one or more lenses and one or more tunable lenses in optical series with each other within the lens barrel. The lens barrel includes once or more integrated electrodes that couple to their respective one or more tunable lenses. The one or more integrated electrodes may couple the one or more tunable lenses to a controller that controls the one or more tunable lenses.

In some embodiments, an imaging device is described. The imaging device includes a lens, a tunable lens, and a lens barrel. The tunable lens may be configured to adjust its optical power in accordance with an applied signal. The lens barrel is configured to hold the lens and the tunable lens in optical series with each other within the lens barrel. The lens barrel includes an integrated electrode that communicatively couples the tunable lens to a printed circuit board (PCB) which supplies the applied signal.

In some embodiments, a lens barrel is described. The lens barrel is configured to hold a lens and a tunable lens in optical series with each other within the lens barrel. The lens barrel may include an integrated electrode that communicatively couples the tunable lens to a controller that controls the tunable lens.

In some embodiments, an imaging device is described. The imaging device includes a lens, a tunable lens, an imaging sensor, and a lens barrel. The tunable lens is configured to adjust its optical power in accordance with an applied signal. The imaging sensor is coupled to a printed circuit board (PCB). The lens barrel is configured to hold the lens and the tunable lens in optical series with each other within the lens barrel such that the lens and tunable lens focus light on the imaging sensor. The lens barrel includes an integrated electrode that communicatively couples the tunable lens to the PCB which supplies the applied signal.

Figure 1A:
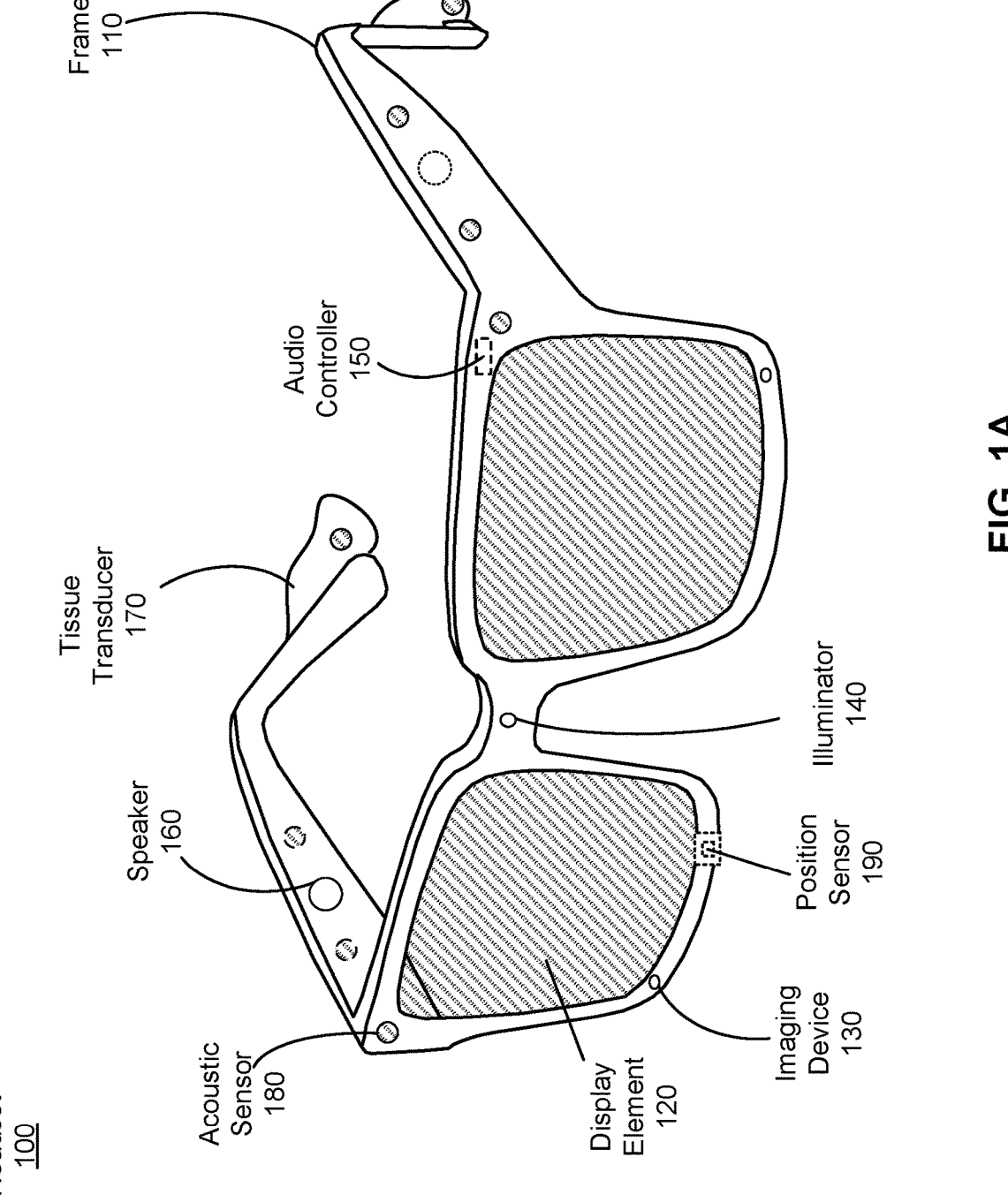
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A lens barrel with one or more integrated tunable lens. The lens barrel may be a part of an imaging device. The imaging device has a small form factor such that it may be integrated into, e.g., a wearable device (e.g., headset). The lens barrel may be configured to hold one or more lenses and one or more tunable lenses in optical series with each other within the lens barrel. The lens barrel includes once or more integrated electrodes that couple to respective one or more tunable lenses. The one or more integrated electrodes may couple the one or more tunable lenses to a PCB that is communicatively coupled to a controller (e.g., on the PCB) that controls the one or more tunable lenses. The imaging device may include a sensor (e.g., imaging sensor, event sensor, etc.). The one or more lenses and the one or more tunable lenses focus the light on the sensor.

The structure of the lens barrel is such that it is quite compact and can be used in devices (e.g., cameras) that require a small form factor. Note that conventional cameras that include a tunable lens in addition to other lens elements do not have the tunable lens integrated into the lens barrel. Instead, conventional camera systems place the passive elements within the lens barrel and the tunable lens outside of the lens barrel which results in a layout with a larger overall length (along the optical axis) than what is described herein. Moreover, alignment in conventional systems is more difficult as the tunable lens which is separate from the lens barrel has to be aligned to the lenses within lens barrel. In contrast, alignment is much easier for the lens barrel with integrated tunable lens—as the lens barrel itself holds the one or more lenses and the one or more tunable lenses in the correct position relative to each other.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world)

content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame and one or more imaging devices 130, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The one or more imaging devices 130 are configured to capture images from a local area of the headset 100. An imaging device includes a lens barrel with an integrated tunable lens and a sensor. The lens barrel may be configured to hold one or more lenses and one or more tunable lenses in optical series with each other within the lens barrel. The one or more lenses and the one or more tunable lenses focus the light on the sensor. The lens barrel includes one or more integrated electrodes that couple to respective one or more tunable lenses. The one or more integrated electrodes may communicatively couple the one or more tunable lenses to a PCB that is communicatively coupled to a controller (e.g., on the PCB) that controls the one or more tunable lenses. The imaging device 130 is described in detail below with regard to, e.g., FIGS. 2-5.

The DCA determines depth information for a portion of a local area surrounding the headset 100. The DCA includes one or more of the imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
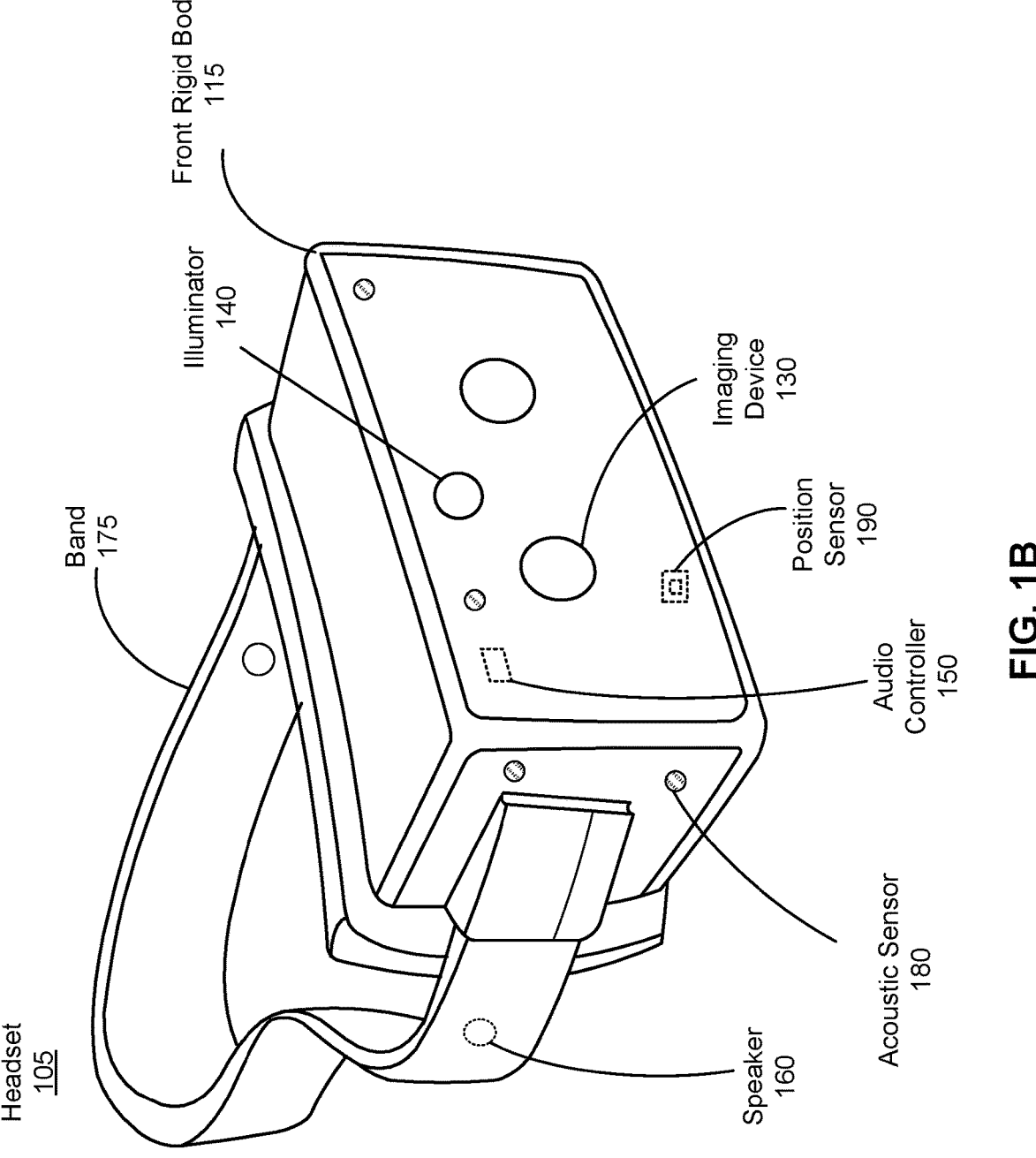
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
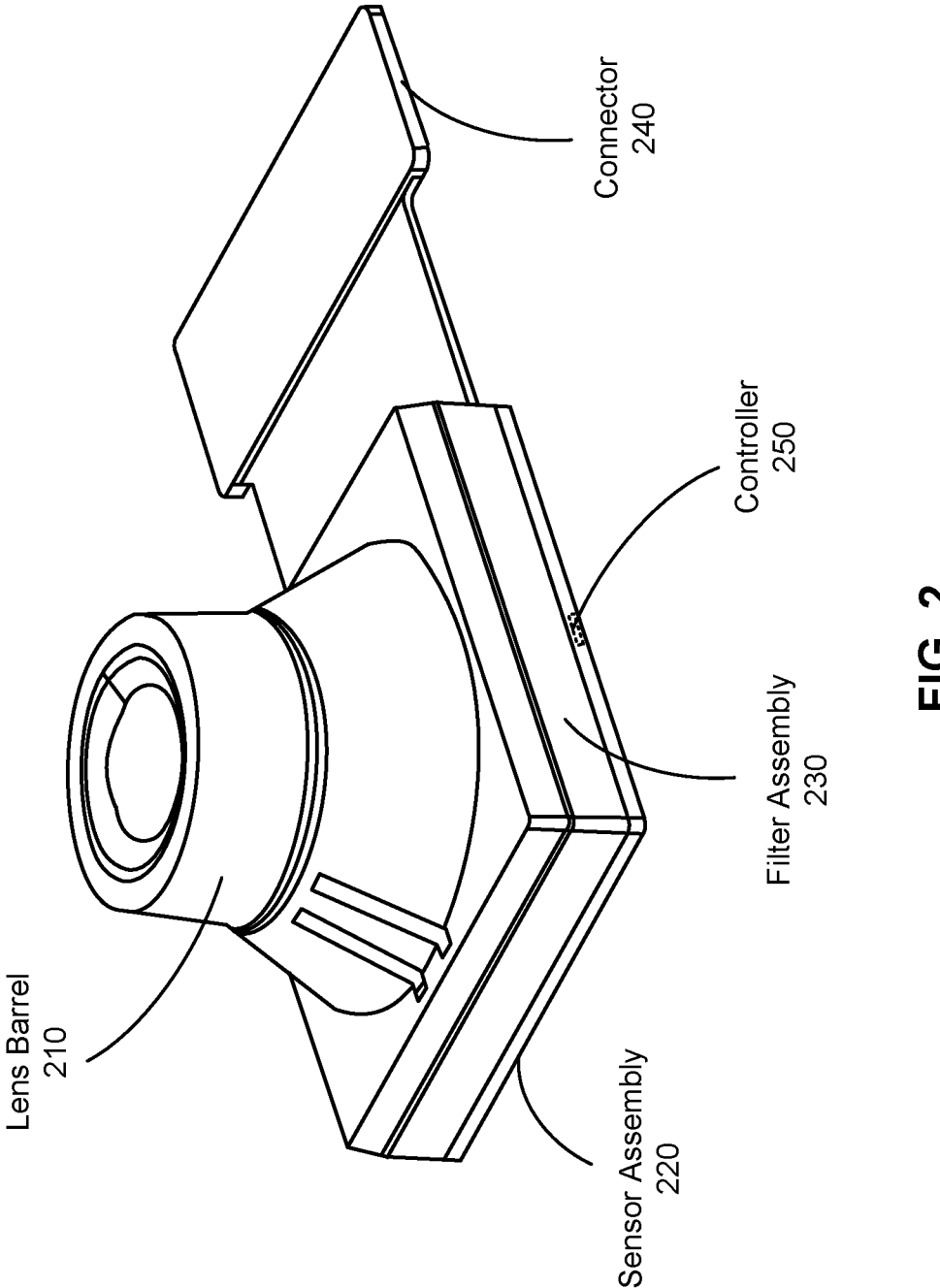
FIG. 2 is a perspective view of an example imaging device with a lens barrel having one or more integrated tunable lenses, according to one or more embodiments.

FIG. 2 is a perspective view of an example imaging device 200 with s lens barrel 210 having one or more integrated tunable lenses, according to one or more embodiments. The imaging device 130 is an embodiment of the imaging device 200. The imaging device 200 includes the lens barrel 210, and a sensor assembly 220, and optionally includes a filter assembly 230. Some embodiments of the imaging device 200 have different components than those described here. Similarly, in some cases, functions can be distributed among the components in a different manner than is described here. The imaging device 200 may be integrated into a device (e.g., headset 100) via a connector 240. As shown, the imaging device includes a controller 250 that controls the imaging device 200. In other embodiments, the controller 250 may be part of the device (e.g., headset) in which the imaging device is integrated. Moreover, in some cases the controller may deliver relatively high voltage, so placement within the imaging device 200 can help reduce ohmic voltage losses. For example, as shown, the controller 250 can be integrated on a same PCB as the sensor assembly 220.

The lens barrel 210 holds optical elements in series with each other within the lens barrel 210. The optical elements include one or more lenses and one or more tunable lenses. The one or more lenses are passive elements that each have a fixed optical power. The one or more tunable lenses are active elements whose respective optical powers can be adjusted via application of an electric signal. For example, the one or more tunable lenses may use the piezoelectric effect to adjust a curvature of a membrane to adjust optical power. The lens barrel 210 is described in detail below with regards to FIGS. 3A-5.

The filter assembly 230 filters light received from the lens barrel 210. The filter assembly 230 may include one or more band pass filters that together act to transmit light that is within a specific band and block light outside of the specific band. For example, the filter assembly 230 may be configured to block light in an infrared optical band and transmit light in a visible optical band. In another embodiment, the filter assembly 230 may be configured to transmit light in the infrared band (or a portion thereof) and block other light (e.g., light in the visible optical band).

The sensor assembly 220 is configured to detect light transmitted by the optical components within the lens barrel 210 to the sensor assembly 220. The sensor assembly 220 includes one or more sensors that are sensitive to one or more optical bands of light. The one or more sensors may, be complementary metal-oxide semiconductor based, charge-coupled device based. In some embodiments, one or more of the sensors are event sensors.

The controller 250 controls the imaging device 200. The controller 250 is communicatively coupled to the sensor assembly 220 and the one or more tunable lenses. As shown the controller 250 is coupled to a same PCB that the sensor assembly 220 is mounted to. Signals from the controller 250 may be applied to the one or more tunable lenses via one or more integrated electrodes that communicatively couple the one or more tunable lenses to the PCB the sensor assembly 220 is mounted on. The one or more integrated electrodes are discussed in detail below with regard to FIGS. 3A-5.

Figure 3A:
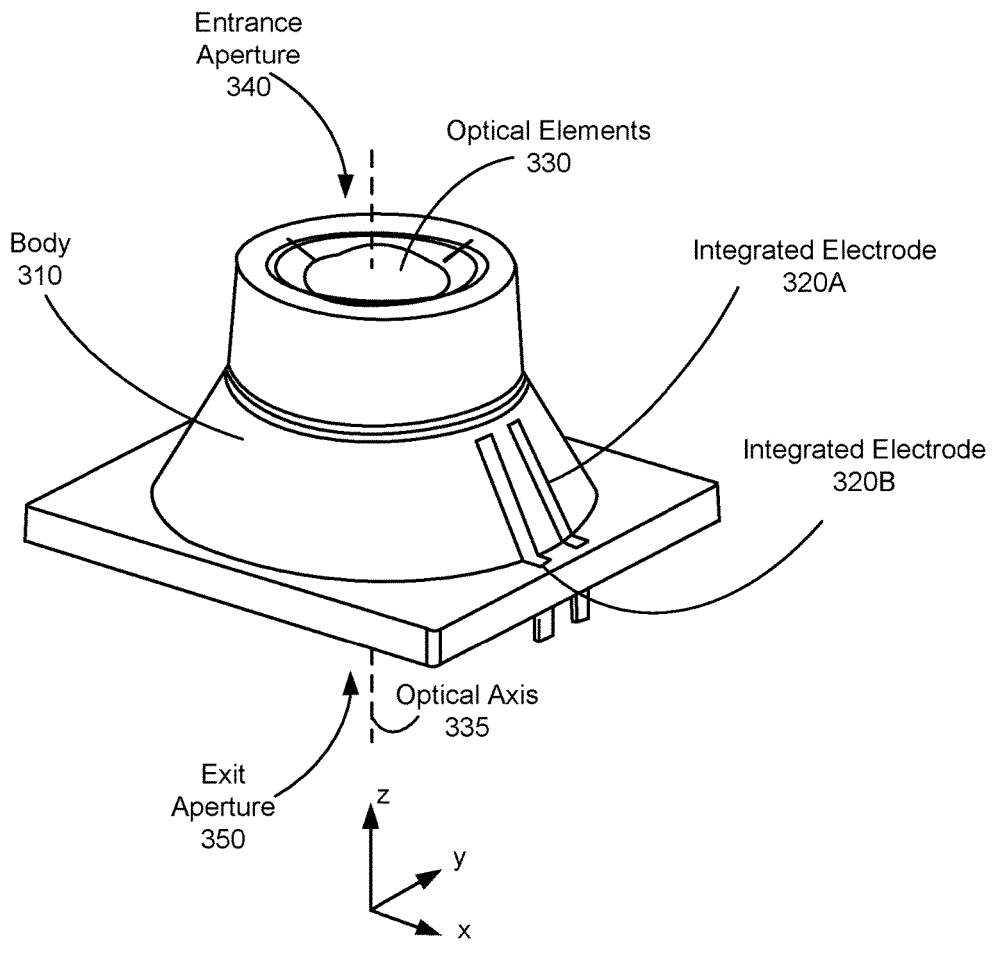
FIG. 3A is a perspective view of the lens barrel of FIG. 2.

FIG. 3A is a perspective view of the lens barrel 210 of FIG. 2. The lens barrel 210 holds optical elements 330 in series with each other within the lens barrel 210. The lens barrel 210 includes a body 310, one or more integrated electrodes (e.g., integrated electrode 320A and integrated electrode 320B), and optical elements 330. Some embodiments of the lens barrel 210 have different components than those described here. Similarly, in some cases, functions can be distributed among the components in a different manner than is described here.

The body 310 is configured to hold the optical elements 330 in optical series with each other along an optical axis 335. As illustrated the body 310 may be monolithic (e.g., a single piece of material, multiple piece of a material that have fused together). The body 310 may be composed from, e.g., an injection molded plastic resin. In some embodiments the resin is a laser direct structuring (LDS) grade resin. The body 310 has an entrance aperture 340 and an exit aperture 350. Light passes through the entrance aperture 340 to the optical elements 330, and exits from the optical elements 330 via the exit aperture 350 towards a sensor assembly (e.g., the sensor assembly 220). As illustrated portions of the body 310 have a circular cross section (in x and y dimensions). In other embodiments, some or all of the body 310 may have a different shaped cross section. Some or all of an interior surface (not shown) of the body 310 may be coated with an anti-reflective coating (e.g., to help reduce stray light). The body 310 may include one or more holes that connect the interior surface of the body 310 to an exterior surface of the body 310. The one or more holes may filled with conductive material of the one or more integrated electrodes.

The optical elements 330 are configured to provide light from a local area to a sensor assembly (e.g., the sensor assembly 220). The optical elements 330 include one or more lenses and one or more tunable lenses. The optical elements 330 are in optical series with each other along the optical axis 335. The one or more lenses are passive elements that each have a fixed optical power. The one or more tunable lenses are active elements whose respective optical powers can be adjusted via application of an electric signal. A tunable lens is configured to adjust its optical power over a range of optical power (e.g., 0 to 5 diopters, 0 to –5 diopters, etc.). In cases where there are multiple tunable lenses, the range of optical power for each tunable lens may be the same. In other embodiments, at least one of the tunable lenses has a range of optical power that is different from at least one other tunable lens. For example, one tunable lens may have a range of optical powers that is positive (e.g., 0 to 5 diopters) and another may have a range of optical powers that is negative (e.g., 0 to –5 diopters). In some embodiments, a tunable lens may be configured such that when no voltage is applied it still provides some amount of optical power. Each tunable lens adjusts its optical power in accordance with an electric signal applied from one or more integrated electrodes. For example, in some embodiments a tunable lens may be coupled to two integrated electrodes. A tunable lens is any lens that can vary its optical power as a function of an applied electric signal. For example, a tunable lens may be an electro-optical tunable lens based on electro-wetting, may be based on electro-mechanical techniques (e.g., using piezoelectric effect to change membrane curvature), may be based on acousto-optical techniques, etc.

The one or more integrated electrodes communicatively couple the one or more tunable lenses to a PCB. The PCB may be coupled to a controller (e.g., the controller 250) which can supply the signals to control the optical power of the one or more tunable lenses. While the illustrated embodiment includes two integrated electrodes 320A and 320B, in other embodiments there may be less or more integrated electrodes. An integrated electrode includes at least one via and a conductive trace (that is applied to the exterior surface of the body 310). The via is a conductive material that fills a hole in the body 310. For example, a via is used to couple a tunable lens that is within the body 310 to conductive trace of an integrated electrode. The one or more integrated electrodes are electrical conductors, and may be composed from, e.g., gold, silver, copper, aluminum, etc. The conductive trace of an integrated electrode (e.g., 320A, 320B) may be implemented directly on the exterior surface of the body 310 via a LDS process. Some layouts of the one or more integrated electrodes are described below with regard to, e.g., FIGS. 3B and 3C.

Figure 3B:
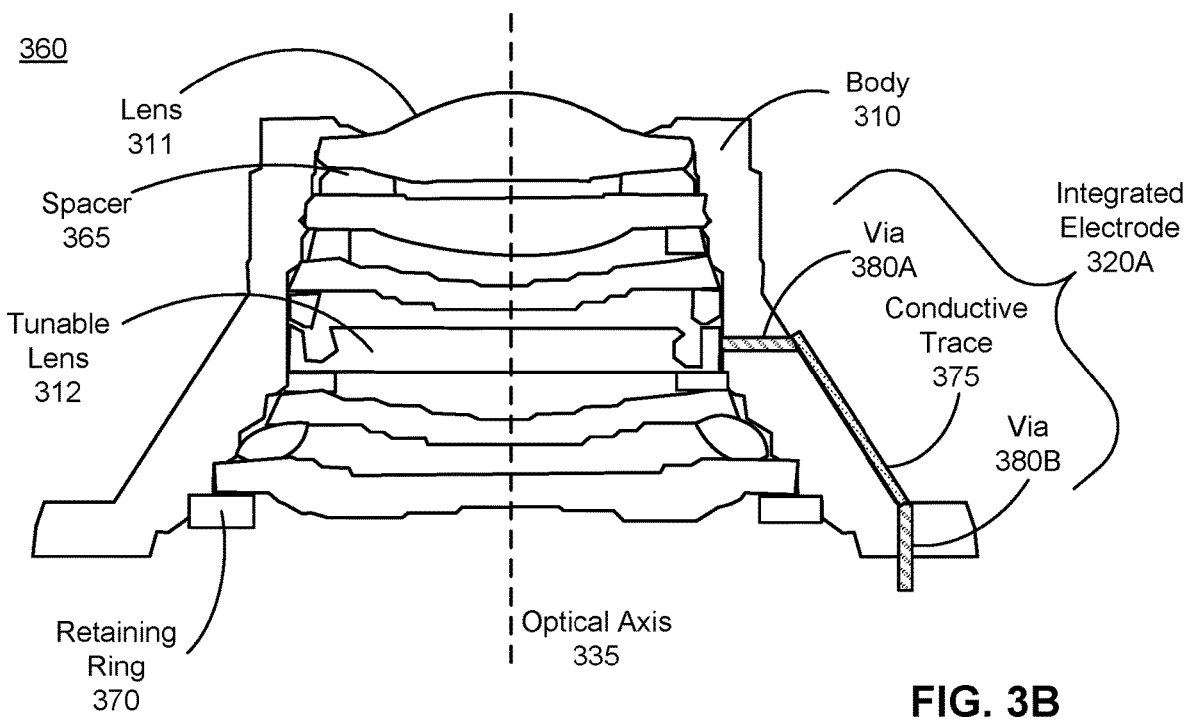
FIG. 3B is a cross section of the lens barrel of FIG. 3A.

FIG. 3B is a cross section of the lens barrel 210 of FIG. 3A. As illustrated the body 310 includes a plurality of lenses (e.g., lens 311) and a tunable lens 312. Note in other embodiments, there may be different types of lenses, different numbers of lenses, more tunable lenses, etc. Likewise, in other embodiments, the tunable lens 312 may be placed in different locations within the body 310. The lenses and the tunable lens 312 are in optical series along the optical axis 335, and are separated from adjacent optical components via spacers (e.g., spacer 365), and held within the body 310 using a retaining ring 370. In some embodiments, some or all of the lenses, the tunable lens 312, and the retaining ring 370, are further fixed in place with an adhesive. Note that a conductive adhesive may be used to couple the tunable lens 312 to the integrated electrode 320A. As illustrated, the integrated electrode 320A includes a conductive trace 375, a via 380A, and a via 380B. The via 380A is positioned within a corresponding hole in the body 310 and conductively couples the tunable lens 312 to the conductive trace 375. And the via 380B is located in a hole in the body 310, and extends past the body 310 and couple (e.g., via solder, conductive epoxy, etc.) to other components (e.g., the controller and/or power, etc.) on one or more PCBs.

The vias 380A, 380B and the conductive trace 375 are made out of one or more conductors. In some embodiments the via 380A, the via 380B, and the conductive trace 375, or some combination thereof, are made out of a same material. In other embodiments, at least one of the via 380A, the via 380B, and the conductive trace 375 is made out of a conductive material that differs from the other (e.g., the vias 380A, 380B are made out one type of conductor and the conductive trace 375 out of a different type of conductor). The conductive trace 375 may be applied (e.g., via a LDS process) directly on the exterior surface of the body 310 to couple the via 380A to the via 380B.

Figure 3C:
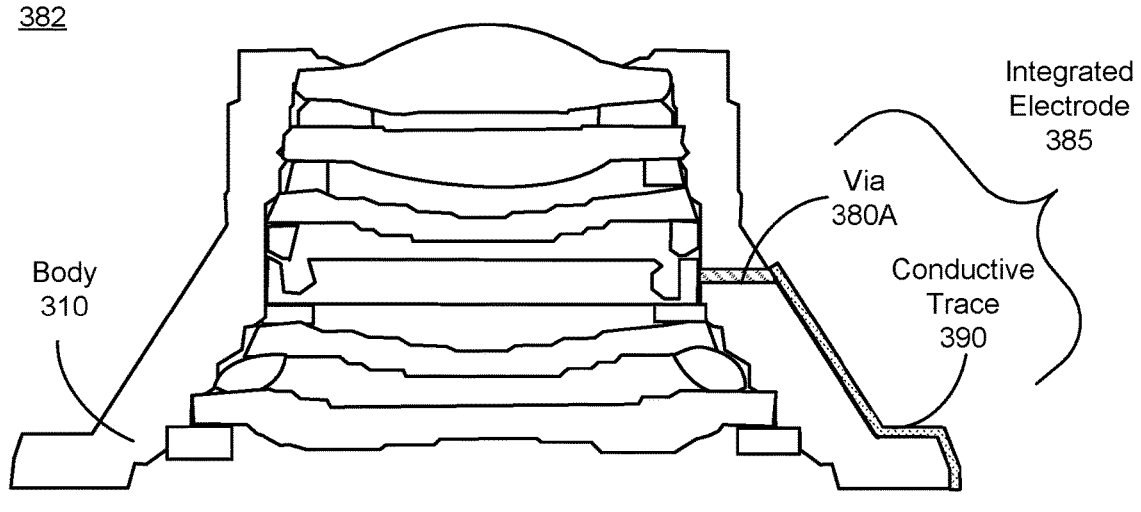
FIG. 3C is a cross section of a lens barrel using an integrated electrode having a single via, according to one or more embodiments.

FIG. 3C is a cross section of a lens barrel 382 using an integrated electrode 385 having a single via 380A, according to one or more embodiments. The lens barrel 382 is substantially the same as the lens barrel 210, except that the integrated electrode 385 differs in structure from the integrated electrodes shown in FIGS. 2, 3A, and 3C which have two vias. The integrated electrode 385 includes the via 380A and a conductive trace 390. The conductive trace 390 is applied to the exterior surface of the body 310 and runs from the via 380A to an edge of the body 310 where it would couple to a conductive connector (not shown).

Figure 4:
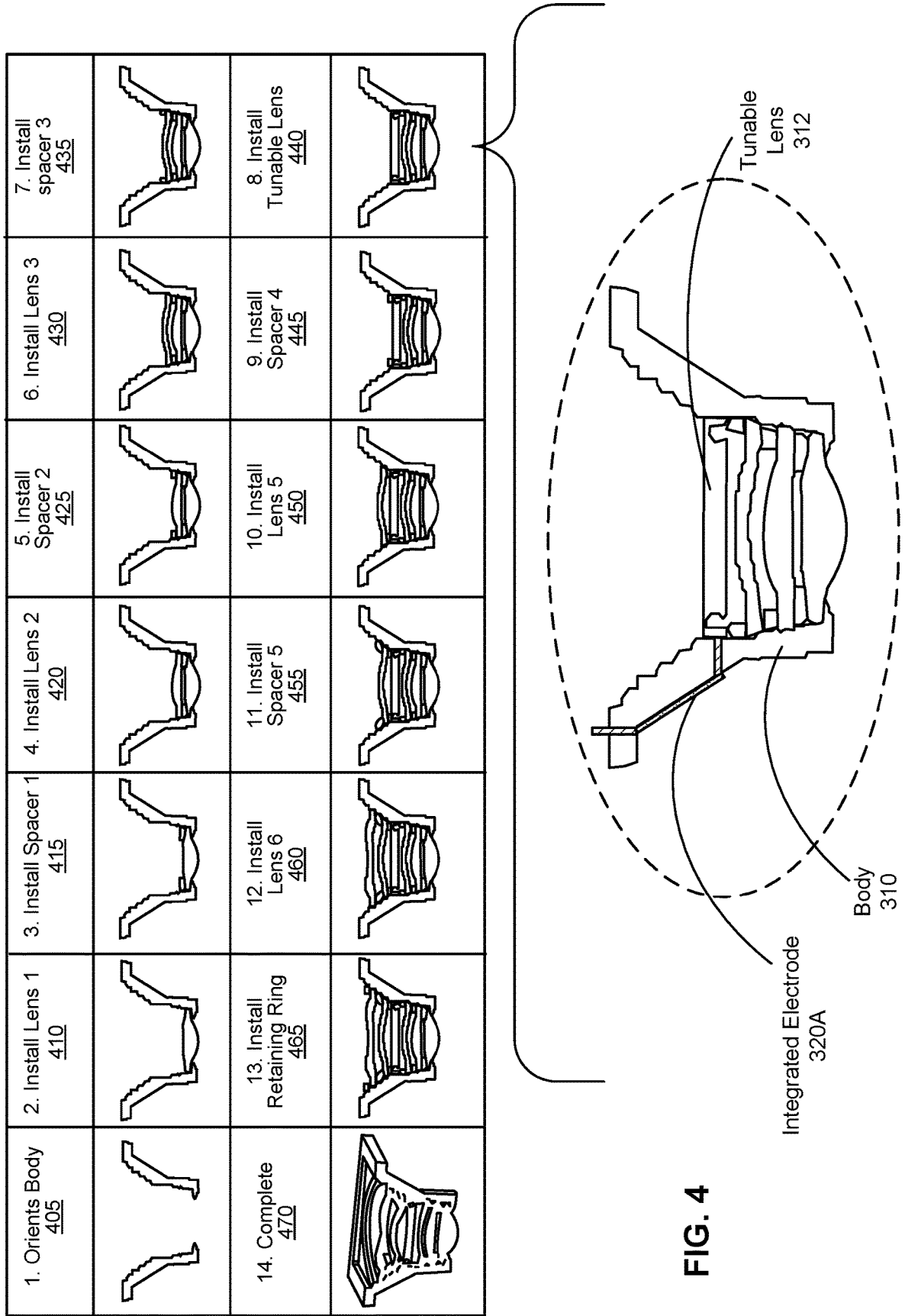
FIG. 4 is an example process for assembling the lens barrel of FIG. 3A.

FIG. 4 is an example process for assembling the lens barrel 210 of FIG. 3A. The process shown in FIG. 4 may be performed by, e.g., a lens barrel manufacturing system (LBM system). Other entities may perform some or all of the steps in FIG. 4 in other embodiments. Embodiments may include different and/or additional steps, or perform the steps in different orders.

The LBM system orients a body (e.g., the body 310), and installs 410 a first lens (Lens 1) in the body. The LBM system installs 415 a spacer (Spacer 1) along some or all of the periphery of Lens 1 in the body. The LBM system repeats the process of lens installation followed by an associated spacer in steps 420, 425, 430, and 435 to install Lens 2, Lens 3, and associated Spacer 3 and Spacer 3. The LBM system then installs 440 a tunable lens (e.g., the tunable lens 312). As part of 440 the LBM system electrically couples the tunable lens 312 to a via of the integrated electrode 320A. For example, the LBM system may use a conductive adhesive to electrically couple the tunable lens 312 to the via of the integrated electrode 320A. The LBM system then installs spacers (Spacer 4, Spacer 5) and associated lenses (Lens 5 and Lens 6) in steps 445, 445, 455, and 460. The LBM system installs 465 a retaining ring (e.g., the retaining ring 370), resulting in a complete 470 lens barrel. Note that the interior surface of the body is shaped such that each optical element within it (e.g., lens, tunable lens) is positioned such that they are in correct alignment. This results in less time spent on alignment than in conventional camera systems that have a tunable lens outside of the lens barrel.

Figure 5:
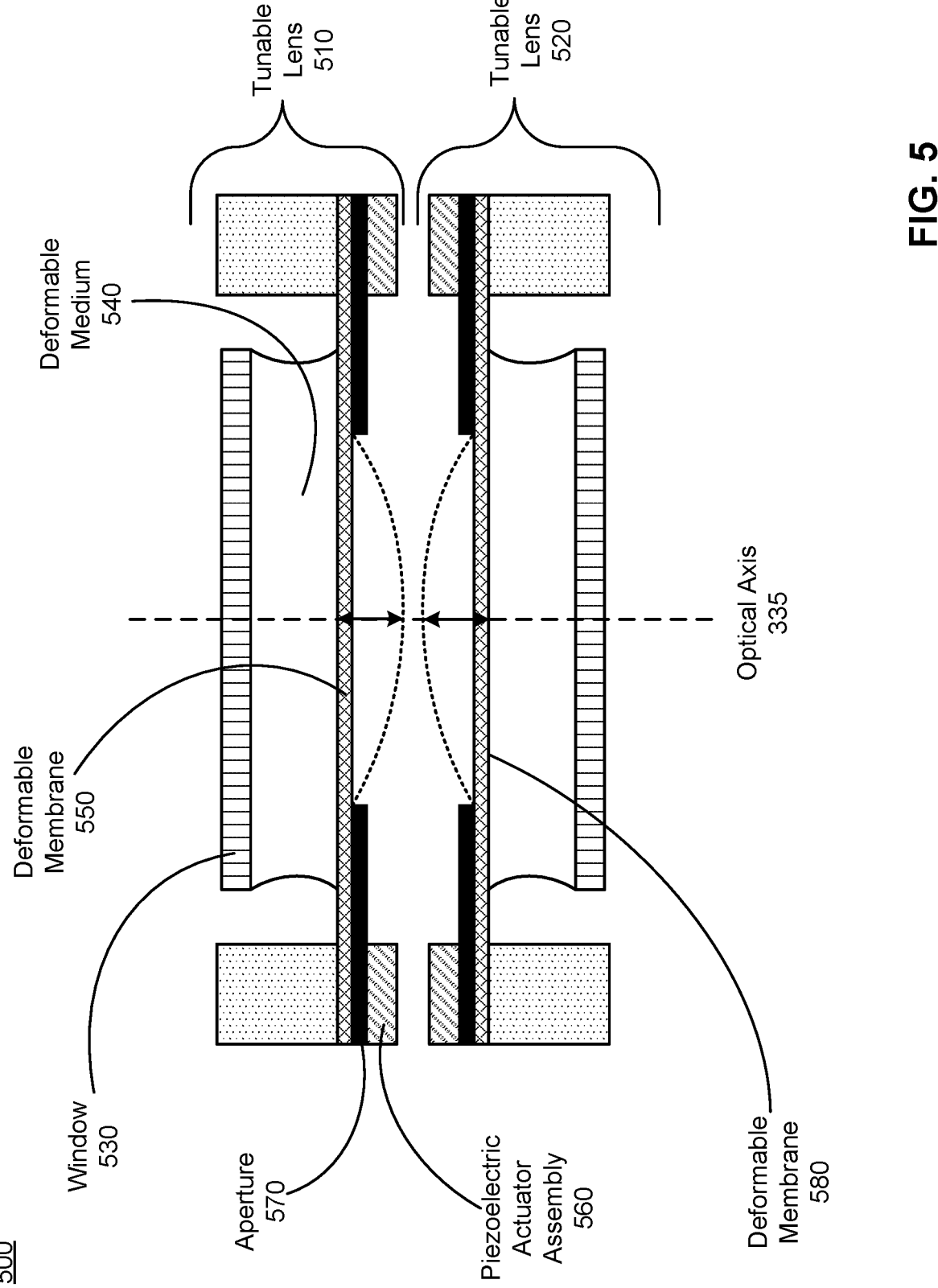
FIG. 5 is an example configuration of a tunable lenses that has a range of optical powers that includes both negative and positive values, according to one or more embodiments.

FIG. 5 is an example configuration 500 of a tunable lenses that has a range of optical powers that includes both negative and positive values, according to one or more embodiments. The configuration 500 may be integrated into a lens barrel (e.g., the lens barrel 210) to provide, e.g., a larger range of optical power adjustment that a single tunable lens can provide. The configuration 500 includes a tunable lens 510 and a tunable lens 520. The tunable lens 510 and the tunable lens 520 are in optical series with each other along the optical axis 335. As illustrated the tunable lens 520 is substantially the same as the tunable lens 510, but is inverted relative to the tunable lens 510. Accordingly, the tunable lens 510 would have a positive range of optical power (e.g., 0 to +N diopters, where N number that is greater than or equal to zero) and the tunable lens 520 would have a negative range of optical power (e.g., 0 to −N). Note in alternate embodiments the tunable lens 510 may differ from the tunable lens 520 such that they have different ranges of optical power (e.g., 0 to +N and 0 to −0.5 N, respectively). Likewise, in alternate embodiments, the tunable lens 520 may not be inverted relative the tunable lens 510.

The tunable lens 510 is configured to adjust its optical power in accordance with an applied signal. The tunable lens 510 includes a window 530, a deformable medium 540 (e.g., polymer), a deformable membrane 550 (e.g., deformable glass membrane), a piezoelectric actuator assembly 560, and optionally includes an aperture 570. The piezoelectric actuator assembly 560 incudes one or more piezoelectric actuators that control a surface profile of the deformable membrane 550 responsive to receiving an electrical signal (e.g., via an integrated electrode). As illustrated the tunable lens 510 (and the tunable lens 520) are in a first position in which the deformable membrane 550 is substantially flat (0 diopters). However, responsive to a received electrical signal the piezoelectric actuator assembly 560 applies one or more forces to the deformable membrane 550 to cause it to bend toward the tunable lens 520 introducing curvature into the surface profile of the deformable membrane 550. In this manner, the tunable lens 510 is able to dynamically adjust its optical power from zero up to +N diopters.

As noted above, the tunable lens 520 is substantially the same as the tunable lens 510, but it inverted relative to the tunable lens 510. Accordingly, application of an electric signal to the tunable lens 520 (via its piezoelectric actuator assembly) causes a deformable membrane 580 to bend toward the tunable lens 510 introducing curvature into a surface profile of the deformable membrane 580. In this manner, the tunable lens 520 is able to dynamically adjust its optical power from zero down to −N diopters. Accordingly, the configuration 500 as shown has an optical range of (−N to +N) diopters.

Figure 6:
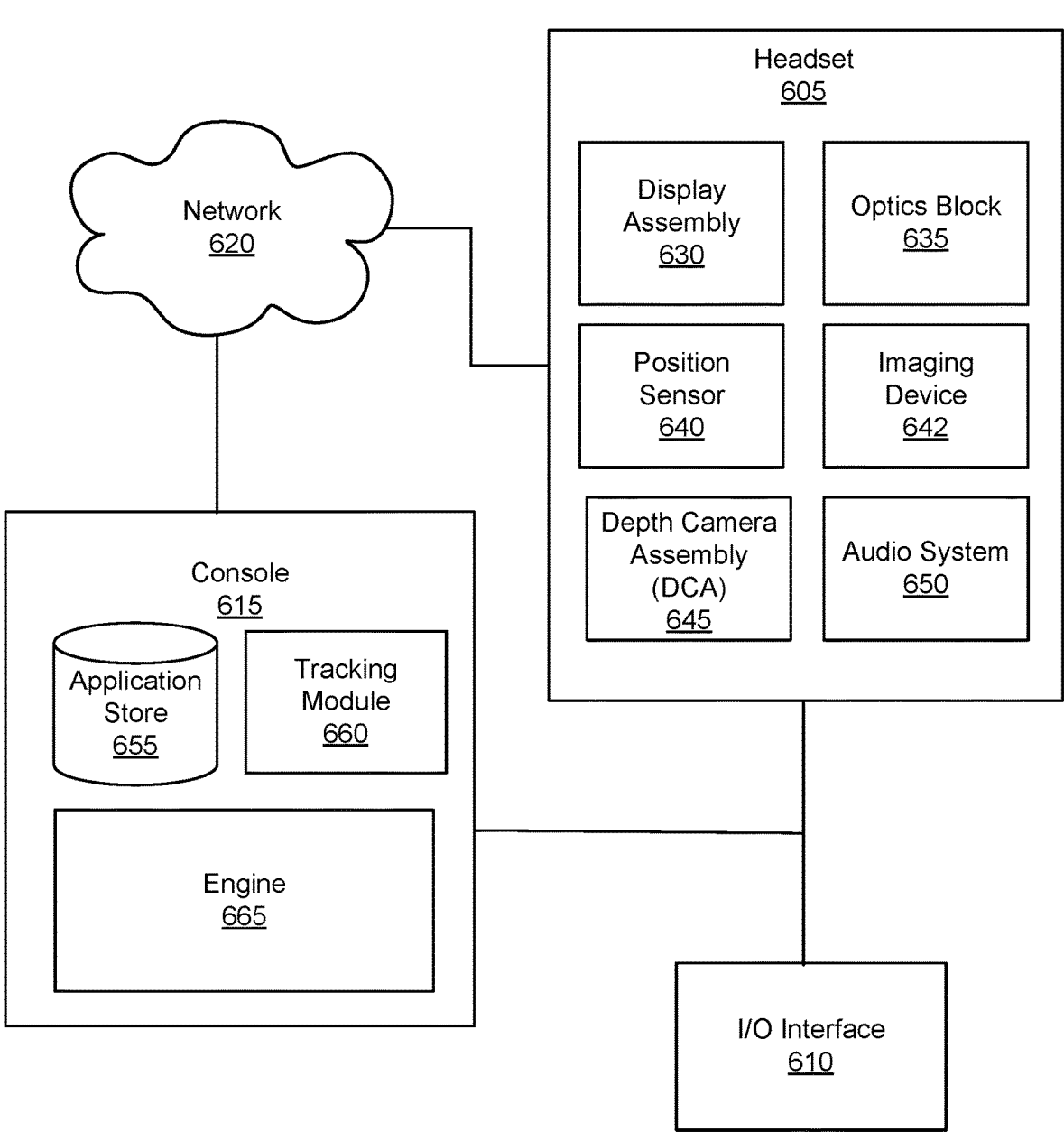
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, and the network 620. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, one or more imaging devices 642, a DCA 645, and an audio system 650. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The one or more imaging devices 642 are configured to capture images from a local area of the headset 605. The one or more imaging devices 642 are embodiments of the imaging device described above with reference to, e.g., FIGS. 1A-5. An imaging device 642 includes a lens barrel with an integrated tunable lens and a sensor. The lens barrel may be configured to hold one or more lenses and one or more tunable lenses in optical series with each other within the lens barrel. The one or more lenses and the one or more tunable lenses focus the light on the sensor. The lens barrel includes one or more integrated electrodes that couple to respective one or more tunable lenses. The one or more integrated electrodes may couple the one or more tunable lenses to a PCB that is communicatively coupled to a controller that controls the one or more tunable lenses.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 may be substantially the same as the audio system described above with regard to FIG. 1A. The audio system 650 may comprise one or acoustic sensors, one or more transducers, and an audio controller. The audio system 650 may provide spatialized audio content to the user. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An imaging device comprising:
a lens;
a tunable lens configured to adjust its optical power in accordance with an applied signal; and
a lens barrel configured to hold the lens and the tunable lens in optical series with each other within the lens barrel, the lens barrel including an integrated electrode that communicatively couples the tunable lens to a printed circuit board (PCB) which supplies the applied signal, wherein the tunable lens is disposed between the lens and the PCB, and wherein the integrated electrode includes a conductive via running from an exterior surface of the lens barrel through the lens barrel to an interior surface of the lens barrel and to the tunable lens.

2. The imaging device of claim 1, wherein the lens barrel is monolithic.

3. The imaging device of claim 1, further comprising:
a second lens;
wherein the tunable lens is positioned between the lens and the second lens.

4. The imaging device of claim 1, wherein the tunable lens is configured to adjust its optical power over a first range of optical power, and the imaging device further comprising:
a second tunable lens within the lens barrel, the second tunable lens in optical series with the lens and the tunable lens, and the second tunable lens is configured to adjust its optical power over a second range of optical power in accordance with a second applied signal.

5. The imaging device of claim 4, wherein the first range of optical power describes a positive range of optical power, and the second range of optical power describes a negative range of optical power.

6. A lens barrel configured to hold a lens and a tunable lens in optical series with each other within the lens barrel, the lens barrel including an integrated electrode, wherein the integrated electrode communicatively couples the tunable lens to a controller that controls the tunable lens, the integrated electrode comprising:
a conductive trace applied to an exterior surface of the lens barrel;
a first conductive via that is configured to couple the tunable lens within the lens barrel to a first end of the conductive trace; and
a second conductive via that is configured to couple a second end of the conductive trace to a conductive connector which couples to a printed circuit board, wherein the first conductive via is configured to couple to an electrode of the tunable lens via a conductive adhesive.

7. The lens barrel of claim 6, wherein a body of the lens barrel is monolithic.

8. The lens barrel of claim 6, wherein the lens barrel is further configured to hold a second lens, and hold the tunable lens between the lens and the second lens.

9. The lens barrel of claim 6, wherein the tunable lens is configured to adjust its optical power over a first range of optical power, and the lens barrel is further configured to hold a second tunable lens within the lens barrel, wherein the second tunable lens is in optical series with the lens and the tunable lens, and the second tunable lens is configured to adjust its optical power over a second range of optical power in accordance with a second applied signal.

10. The lens barrel of claim 9, wherein the first range of optical power describes a positive range of optical power, and the second range of optical power describes a negative range of optical power.

11. An imaging device comprising:

a lens;

a tunable lens configured to adjust its optical power in accordance with an applied signal;

an imaging sensor coupled to a printed circuit board (PCB); and a lens barrel configured to hold the lens and the tunable lens in optical series with each other within the lens barrel such that the lens and tunable lens focus light on the imaging sensor, the lens barrel including an integrated electrode that communicatively couples the tunable lens to the PCB which supplies the applied signal, wherein the integrated electrode includes a conductive trace applied to an exterior surface of the lens barrel and a conductive via that couples the tunable lens within the lens barrel to the conductive trace, the conductive via coupled to an electrode of the tunable lens via a conductive adhesive.

12. The imaging device of claim 11, wherein a body of the lens barrel is monolithic.

13. The imaging device of claim 11, further comprising:

a second lens;

wherein the tunable lens is positioned between the lens and the second lens.

14. The imaging device of claim 11, wherein the tunable lens is configured to adjust its optical power over a first range of optical power, and the imaging device further comprising:

a second tunable lens within the lens barrel, the second tunable lens in optical series with the lens and the tunable lens, and the second tunable lens is configured to adjust its optical power over a second range of optical power in accordance with a second applied signal.

* * * * *